(12) United States Patent
Sato

(10) Patent No.: US 7,782,379 B2
(45) Date of Patent: Aug. 24, 2010

(54) CORRECTIVE OPERATION IN CONTINUOUS SHOOTING

(75) Inventor: Yoichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1033 days.

(21) Appl. No.: 10/712,012

(22) Filed: Nov. 14, 2003

(65) Prior Publication Data

US 2004/0095487 A1 May 20, 2004

(30) Foreign Application Priority Data

Nov. 20, 2002 (JP) ............................. 2002-336728

(51) Int. Cl.
*H04N 9/64* (2006.01)

(52) U.S. Cl. .................................................. 348/243

(58) Field of Classification Search ................. 348/243
See application file for complete search history.

(56) References Cited

U.S. PATENT DOCUMENTS

| 6,101,287 | A  | * | 8/2000 | Corum et al. | 382/274 |
|---|---|---|---|---|---|
| 7,023,479 | B2 |  | 4/2006 | Hiramatsu et al. | 348/243 |
| 7,136,100 | B1 | * | 11/2006 | Kato et al. | 348/241 |
| 7,339,620 | B1 | * | 3/2008 | Yamagishi et al. | 348/243 |
| 2002/0008766 | A1 | * | 1/2002 | Tariki | 348/243 |
| 2002/0085112 | A1 | * | 7/2002 | Hiramatsu et al. | 348/362 |
| 2005/0253934 | A1 |  | 11/2005 | Yamagishi et al. | 348/222.1 |
| 2005/0253935 | A1 |  | 11/2005 | Hiramatsu et al. | 348/222.1 |

FOREIGN PATENT DOCUMENTS

| JP | 2000-152097 | 5/2000 |
|---|---|---|
| JP | 2000-209486 | 7/2000 |
| JP | 2000-224466 | 8/2000 |
| JP | 2001-145026 | 5/2001 |
| JP | 2001-326850 | 11/2001 |
| JP | 2002-135661 | 5/2002 |

OTHER PUBLICATIONS

U.S. Appl. No. 10/661,553, filed Sep. 15, 2003, Y. Sato.
May 22, 2007 Japanese Office Action in Appln. No. 2002-336728.
Oct. 2, 2007, Decision of Rejection in Appln. No. 2002-336728.

* cited by examiner

*Primary Examiner*—David L Ometz
*Assistant Examiner*—Dillon Durnford-Geszvain
(74) *Attorney, Agent, or Firm*—Fitzpatrick, Cella, Harper & Scinto

(57) ABSTRACT

When storage time has changed during a continuous shooting operation, the storage times are stored. When the continuous shooting operation has been completed or an available capacity of a storage medium has become lower than image data, the data is imaged with the respective storage times without exposure. The exposed image data is processed on the basis of the data acquired by the charge storage of an image pickup device without exposure.

3 Claims, 12 Drawing Sheets

CORRECTIVE OPERATION IN CONTINUOUS SHOOTING

BACKGROUND OF THE INVENTION

1. Field of the Invention

The present invention relates to an imaging device for imaging an object.

2. Description of the Related Art

Electronic-camera imaging devices are currently on the market which record and playback static images and moving images picked up by a solid-state image pickup device including a charge-coupled device (CCD) and a complementary metal-oxide-semiconductor (CMOS) device using a memory card having a solid-state memory device as a recording medium.

The electronic cameras can be switched between a single shooting mode in which an exposure is made each time a shutter button is pushed and a continuous shooting mode in which continuous exposures are made while a shutter button is pressed by shooting-mode selection.

Also a dark-noise corrective processing is allowed in shooting with a solid-state image pickup device including a CCD and a CMOS by operating with dark image data that is read out after charge accumulation, as in main shooting, with the image-pickup device not exposed and main-shooting image data that is read out after charge storage with the image-pickup device exposed.

Therefore, the photographed image data can be corrected for picture degradation such as a dark current noise generated by the image pickup device and a pixel defect due to a minute defect inherent to the image pickup device, thus providing a high-definition image.

Particularly, since the dark current noise increases with charge storage time and an increase in the temperature of the image pickup device, the dark noise correction is useful for the user of an electronic camera because it offers a great picture improving effect in long-time exposure and high-temperature exposure.

In the related-art electronic-camera image pickup devices, as FIG. 12 shows, the following operations are performed to acquire a plurality of image data: after image data is acquired by 20-second exposure, 20-second dark data is acquired; thereafter, after image data is acquired by 20 second exposure, 20-second dark data is acquired; and after image data is acquired by 10-second exposure, 10-second dark data is acquired.

Therefore, the above continuous shooting has a problem in that the next image data cannot be acquired until after one frame of image data has been acquired, dark data is then acquired, thus increasing shutter-release time lag, so that a great photo opportunity is lost.

SUMMARY OF THE INVENTION

It is an object of the present invention to decrease a shutter-release time lag and improve the quality of a captured image.

According to embodiments of the present invention, an imaging device is provided which includes a photoelectric conversion area including a plurality of photoelectric converters; a controller for controlling a first mode for continuously acquiring image data by multiple object imaging operations including an imaging operation with multiple different storage times and a second mode for continuously acquiring correction data acquired in the multiple different storage times with the photoelectric conversion area shielded, after the first mode; and an image processor for correcting the image data.

Further objects, features and advantages of the present invention will become apparent from the following description of the preferred embodiments (with reference to the attached drawings).

DESCRIPTION OF THE PREFERRED EMBODIMENTS

A preferred embodiment of the present invention will be described in detail in accordance with the accompanying drawings.

Figure 1:
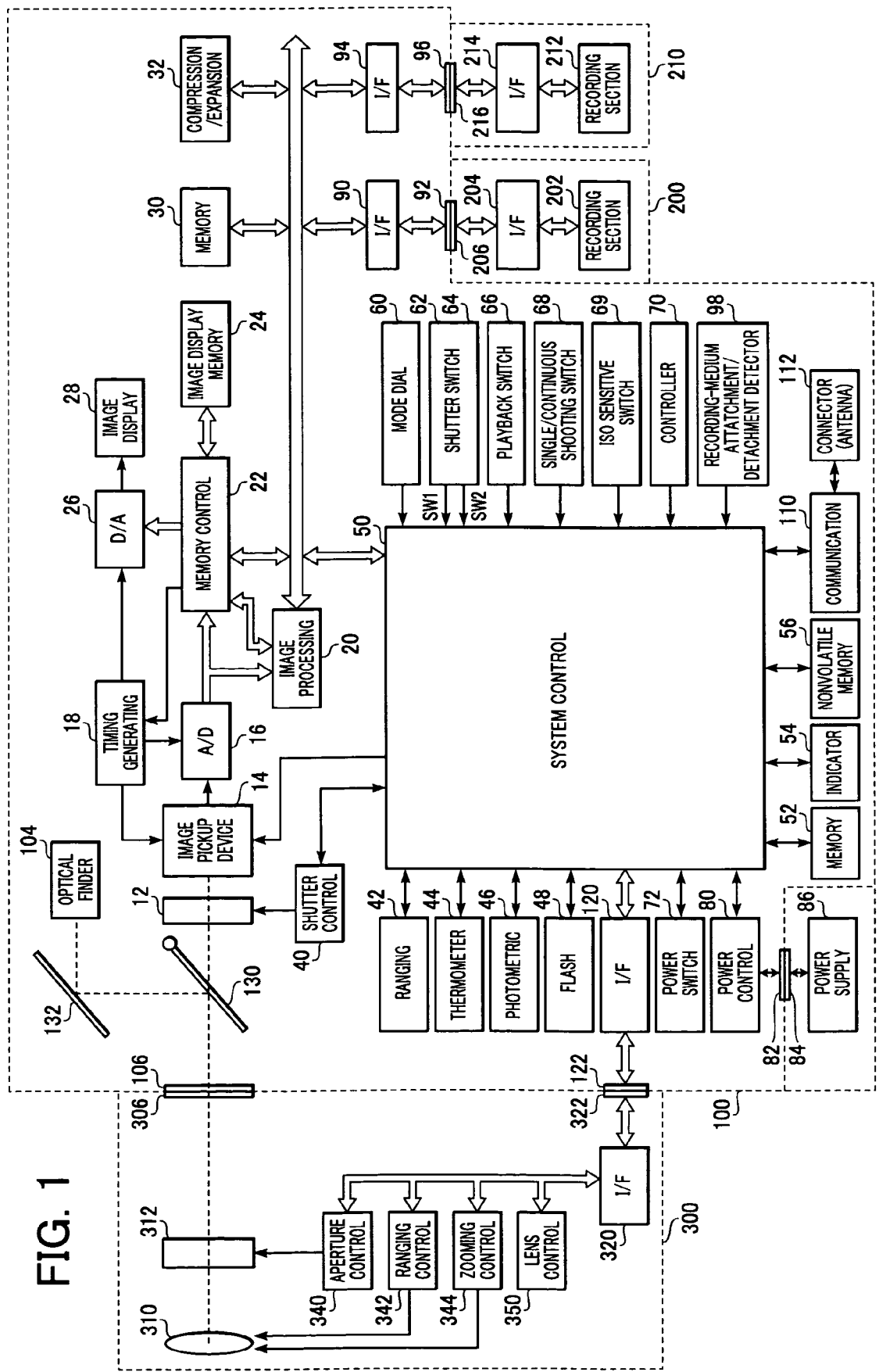
FIG. 1 is a block diagram of first and second embodiments of the present invention.

FIG. 1 shows a structure common to first and second embodiments of the invention.

Referring to FIG. 1, numeral 100 denotes an imaging device.

A shutter 12 controls the exposure to an image pickup device 14. The image pickup device 14 converts an optical image to an electric signal.

Light incident on a lens 310 can be imaged on the image pickup device 14 as an optical image through an aperture 312, lens mounts 306 and 106, a mirror 130, and the shutter 12 by a single lens reflex system.

An A/D converter 16 converts an analog signal outputted from the image pickup device 14 to a digital signal.

A timing generating circuit 18 supplies a clock signal and a control signal to the A/D converter 16 and a D/A converter 26 and is controlled by a memory control circuit 22 and a system control circuit 50.

An image processing circuit 20 performs a predetermined dark correction, pixel interpolation, and color conversion to data from the A/D converter 16 and data from the memory control circuit 22. The image processing circuit 20 performs a predetermined operation by using pickup image data as necessary. On the basis of the obtained operation result, the system control circuit 50 can control a shutter control circuit 40 and a ranging circuit 42 for automatic focusing (AF), automatic exposure (AE), and flash light control (EF) by a through-the-lens (TTL) system.

The image processing circuit 20 performs a predetermined operation by using pickup image data and also performs a TTL-system auto white balancing (AWB) on the basis of the obtained operation result.

This embodiment has a dedicated ranging circuit 42 and photometric circuit 46. Therefore, the AF operation, the AE operation, and the EF operation may be made by using the ranging circuit 42 and the photometric circuit 46, not by using the image processing circuit 20.

Alternatively, the AF operation, the AE operation, and the EF operation may be made by using the ranging circuit 42 and the photometric circuit 46 and also by using the image processing circuit 20.

The memory control circuit 22 controls the A/D converter 16, the timing generating circuit 18, the image processing circuit 20, an image display memory 24, the D/A converter 26, a memory 30, and a compression/expansion circuit 32. The data of the A/D converter 16 is written to the image display memory 24 or the memory 30 through the image processing circuit 20 and the memory control circuit 22, or alternatively, the data of the A/D converter 16 is written to the image display memory 24 or the memory 30 directly through the memory control circuit 22.

Display image data written to the image display memory 24 is displayed on an image display section 28 made of a thin-film-transistor liquid crystal display or the like through the D/A converter 26. Displaying the pickup image data on the image display section 28 one by one allows an electronic finder function to be achieved.

The image display section 28 is capable of freely turning the display on and off by the instruction of the system control circuit 50. When the display is turned off, the power consumption of the imaging device 100 can be remarkably reduced.

The memory 30 stores a photographed still image and moving image and has a sufficient capacity to store a specified number of still images and a specified time of moving images.

Accordingly, also for continuous shooting in which a plurality of still images is continuously photographed and panoramic shooting, a large quantity of images can be written to the memory 30 at high speed.

The memory 30 can also be used as an operating area of the system control circuit 50.

The compression/expansion circuit 32 for compressing and decompressing image data by adaptive discrete cosine transformation (ADCT) reads out an image stored in the memory 30 and compresses or expands it and writes the processed data into the memory 30.

The shutter control circuit 40 controls the shutter 12 in cooperation with an aperture control circuit 340 for controlling the aperture 312, on the basis of photometry information from the photometric circuit 46.

The ranging circuit 42 for AF operation can determine the in-focus state of the image formed as an optical image by letting the light incident on the lens 310 into the ranging circuit 42 through the aperture 312, the lens mounts 306 and 106, the mirror 130, and a ranging submirror (not shown) by a single lens reflex system.

A thermometer 44 can sense the temperature of shooting environment.

When the thermometer 44 is in a sensor, the dark current in the sensor can be predicted more accurately.

The photometric circuit 46 for AE operation can determine the exposure condition of the image formed as an optical image by letting the light incident on the lens 310 into the photometric circuit 46 through the aperture 312, the lens mounts 306 and 106, the mirrors 130 and 132, and a photometric lens (not shown) by a single lens reflex system.

The photometric circuit 46 also has the EF control function in cooperation with a flash 48.

The flash 48 also has an AF-fill-light flood function and a flash light control function.

The system control circuit 50 can also control the shutter control circuit 40, the aperture control circuit 340, and a ranging control circuit 342 for exposure and automatic focusing by a video TTL system on the basis of the operation result by operating the image data acquired by the image pickup device 14 with the image processing circuit 20.

Alternatively, the AF control may be performed by using the measurement by the ranging circuit 42 and the operation result obtained by operating the image data acquired by the image pickup device 14 with the image processing circuit 20.

The exposure control may be performed by using the measurement by the photometric circuit 46 and the operation result obtained by operating the image data acquired by the image pickup device 14 with the image processing circuit 20.

The system control circuit 50 controls the entire imaging device 100. A memory 52 stores constants, variables, programs and so on for operating the system control circuit 50.

An indicator 54, such as a liquid crystal display and a speaker, provides indications including operational states, messages and so on by using characters, images, sounds and so on in accordance with the execution of programs in the system control circuit 50, which is mounted at a single or multiple visible positions near the controller of the imaging device 100, and which is composed of a combination of an LCD, an LED, an sounding element and so on.

Part of the functions of the indicator 54 is mounted in an optical finder 104.

Among the indication contents in the indicator 54, the LCD provides a single shot/continuous shooting indication, a self-timer indication, a compression ratio indication, an ISO sensitivity indication, a record pixel number indication, a record number indication, a photographable-picture remaining number indication, a shutter speed indication, an f/number indication, an exposure correction indication, a flash indication, a red-eye reduction indication, a macro shooting indication, a buzzer setting indication, a watch-battery residual quantity indication, a battery residual quantity indication, an error indication, an information indication with a plural-digit number, an indication of attachment/detachment of recording media 200 and 210, an indication of attachment/detachment of a lens unit 300, a communication I/F operation indication, a date and time indication, an indication of connection with an external computer and so on.

Among the indication contents in the indicator 54, the optical finder 104 provides an in-focus indication, an indication of completion of preparation for shooting, a hand-blurring alarm indication, a flash charge indication, a flash charge completion indication, a shutter speed indication, an f/number indication, an exposure correction indication, an indication of a recording-medium writing operation and so on.

Among the indication contents in the indicator 54, the LED provides an in-focus indication, an indication of completion of preparation for shooting, a hand-blurring alarm indication, a flash charge indication, a flash charge completion indication, an indication of a recording-medium writing operation, a macro-shooting-setting-notification indication, a secondary-cell-recharge-state indication and so on.

Among the indication contents in the indicator 54, the lamp provides a self-timer notification indication and so on. The self-timer notification lamp may be used in common with AF fill light.

An electrically erasable recordable nonvolatile memory 56, such as an electrically erasable programmable read-only memory (EEPROM), stores various parameters, set values including ISO sensitivity, and set modes.

Control elements 60, 62, 64, 68, 69, and 70 are used to input various indications for operating the system control circuit 50 and are constructed of a single or a plurality of combinations of a switch, a dial, a touch panel, a sightline-sensing pointing device, a sound recognition system and so on.

The control elements are specifically described hereinafter.

Numeral 60 denotes a mode dial switch, which can switch various shooting modes among an automatic shooting mode, a program shooting mode, a shutter-speed-priority shooting mode, an aperture-priority shooting mode, a manual shooting mode, a focus-depth-priority shooting mode, a portrait shooting mode, a landscape shooting mode, a close-up shooting mode, a sport shooting mode, a nightscape shooting mode, a panoramic shooting mode and so on.

Numeral 62 denotes a shutter switch SW1, which is turned on during the operation of a shutter button (not shown) to provide instructions to start the operations of automatic focusing, autoexposure, autowhite balancing, flash light control and so on.

Numeral 64 denotes a shutter switch SW2, which is turned on upon the completion of the operation of a shutter button (not shown) to provide instructions to start a series of operations of exposure in which a signal read out from the image pickup device 14 is written to the memory 30 through the A/D converter 16 and the memory control circuit 22, development using the operation result of the image processing circuit 20 and the memory control circuit 22, reading the image data from the memory 30, compressing it by compression/expansion circuit 32, and writing it in the recording medium 200 or 210.

Numeral 66 indicates a playback switch, which provides an instruction to start a playback operation of reading out a photographed image from the memory 30 or the recording medium 200 or 210 and displaying it on the image display section 28 in a shooting mode.

Numeral 68 indicates a single/continuous shooting switch, which can set a single shooting mode in which one frame is photographed when the shutter switch SW2 is pressed and which moves to a standby mode and a continuous shooting mode in which continuous pictures are taken while the shutter switch SW2 is pressed.

Numeral 69 denotes a sensitivity setting switch, which can set an ISO sensitivity by varying the setting of gain in the image pickup device 14 or the image processing circuit 20.

Numeral 70 denotes a controller formed of various buttons and a touch panel, including a menu button, a setting button, a macro button, a multiscreen-playback-newpage button, a flash setting button, a single/continuous/self-timer changeover button, a menu-move plus (+) button, a menu-move minus (−) button, a playback-image-move plus (+) button, a playback-image-move minus (−) button, a picture-quality selection button, an exposure correction button, date/time setting button, a selection/switching button for setting the selection/switching of various functions at the execution of shooting and playback in panoramic mode and so on, a determination/execution button for setting the determination and execution of various functions at the execution of shooting and playback in panoramic mode and so on, an image-display ON\OFF switch for setting the ON/OFF of the image display section 28, a quick-review ON/OFF switch for setting a quick review function for automatically playing back image data directly after photographing, a compression mode switch for selecting a compression ratio of JPEG compression or selecting a CCDRAW mode in which the signal of an image pickup device 14 is digitized and recorded directly in a recording medium, a playback switch capable of setting various function modes including a playback mode, a multiimage playback/erase mode, and a PC connection mode, an AF-mode setting switch capable of setting a one-shot AF mode in which when the shutter switch SW1 is pushed, an autofocusing operation is started, and upon coming into focus, the in-focus state is maintained, and a servo AF mode in which the autofocusing operation is continued while the shutter switch SW1 is pressed.

The values and functions of the plus button and the minus button can be easily selected with rotary dial switches.

Numeral 72 denotes a power switch, which can switch between the power-on and the power-off of the imaging device 100 and also the power-on and the power-off of various additional devices including the lens unit 300, an external flash lamp, the recording media 200 and 210 which are connected to the imaging device 100.

Numeral 80 denotes a power control circuit, which includes a cell detector circuit, a DC-DC converter, a switching circuit for switching blocks that are energized, which determines the presence or absence of a battery, the type of the battery, and a battery remaining quantity and controls the DC-DC converter according to the determination and the instruction of the system control circuit 50 to supply a necessary voltage to components including the recording media 200 and 210 for a necessary period of time.

Numerals 82 and 84 denote connector. Numeral 86 denotes a power circuit including a primary cell such as an alkaline cell and a lithium cell, a secondary cell such as a nickel-cadmium (NiCd) cell, a nickel-metal-hydride (NiMH) cell, and a lithium (Li) cell, and an AC adaptor.

Numerals 90 and 94 denote interfaces with recording media including a memory card and a hard disk; numerals 92 and 96 denote connectors for connection with the recording media including a memory card and a hard disk; and numeral 98 denotes a recording-medium attachment/detachment detector circuit for detecting whether the recording medium 200 or 210 is mounted to the connector 92 or 96.

While this embodiment is described as having two systems of interfaces and connectors for attaching the recording media, it is also possible to include a single or a plurality of attachment systems or, alternatively to include a combination of an interface and a connector with different specifications.

The interface and the connector may be compliant with standards such as Personal Computer Memory Card International Association (PCMCIA) Card and Compact Flash (CF) (R) Card.

When the interfaces 90 and 94 and the connectors 92 and 96 are compliant with standards such as PCMCIA Card and CF (R) Card, image data and administrative information accompanying the image data can be mutually transferred with other computers and peripheral devices including printers by connecting various communication cards including a LAN card, a modem card, a USB card, an IEEE1394 card, a P1284 card, an SCSI card, communication cards for PHSs.

The optical finder 104 can image the light incident on the lens 310 through the aperture 312, the lens mounts 306 and 106, and the mirrors 130 and 132 as an optical image by a single lens reflex system. This allows photographing only with the optical finder 104 without using an electronic finder function by the image display section 28. The optical finder 104 includes therein part of the functions of the indicator 54, such as an in-focus indication, a hand-blurring alarm indication, a flash charge indication, a shutter speed indication, an f/number indication, an exposure correction indication.

A communication circuit 110 includes various communication functions including RS232C, USB, IEEE1394, P1284, SCSI, a modem, an LAN, and wireless communications.

Numeral 112 denotes a connector for connecting the imaging device 100 with other devices through the communication circuit 110 or an antenna for wireless communications.

Numeral 120 denotes an interface for connecting the imaging device 100 with the lens unit 300 in the lens mount 106; numeral 122 denotes a connector for electrically connecting the imaging device 100 with the lens unit 300; and numeral 124 denotes a lens attachment/detachment detector circuit for detecting whether the lens unit 300 is attached to the lens mount 106 or the connector 122.

The connector 122 transmits a control signal, a status signal, a data signal and so on between the imaging device 100 and the lens unit 300 and also includes the function of supplying currents of various voltages. The connector 122 may be used not only for electrical communication but also for optical communication, audio communication and so on.

The mirrors 130 and 132 can guide the light incident on the lens 310 to the optical finder 104 by a single lens reflex system. The mirror 132 may be either a quick-return mirror or a half mirror.

The recording medium 200 includes a memory card and a hard disk.

The recording medium 200 includes a recording section 202 including a semiconductor memory and a magnetic disk, an interface 204 with the imaging device 100, and a connector 206 for connecting with the imaging device 100.

The recording medium 210 includes a memory card and a hard disk.

The recording medium 210 includes a recording section 212 including a semiconductor memory and a magnetic disk, an interface 214 with the imaging device 100, and a connector 216 for connecting with the imaging device 100.

The lens unit 300 is of an interchangeable lens type.

The lens mount 306 mechanically joins the lens unit 300 with the imaging device 100. The lens mount 306 includes therein various functions of electrically connecting the lens unit 300 with the imaging device 100.

Numeral 310 denotes a taking lens; and numeral 312 denotes an aperture.

Numeral 320 denotes an interface for connecting the lens unit 300 with the imaging device 100 in the lens mount 306; and the numeral 322 denotes a connector for electrically connecting the lens unit 300 with the imaging device 100.

The connector 322 transmits a control signal, a status signal, a data signal and so on between the imaging device 100 and the lens unit 300 and also includes the function of mutually supplying currents of various voltages. The connector 322 may be used not only for electrical communication but also for optical communication, audio communication and so on.

The aperture control circuit 340 controls the aperture 312 in cooperation with the shutter control circuit 40 for controlling the shutter 12 on the basis of photometry information from the photometric circuit 46.

Numeral 342 denotes a ranging control circuit for controlling the focusing of the taking lens 310; and numeral 344 denotes a zooming control circuit for controlling the zooming of the taking lens 310.

Numeral 350 denotes a lens-system control circuit for controlling the entire lens unit 300. The lens-system control circuit 350 includes the functions of a memory of constants, variables, and programs for operation and a nonvolatile memory for storing the identification information such as a number unique to the lens unit 300, administrative information, functional information including a release f/number, the minimum f/number, and a focal distance, and current and past set values.

Referring to FIGS. 2 to 6, the operations of the first and second embodiments of the present invention will be described.

Figure 2:
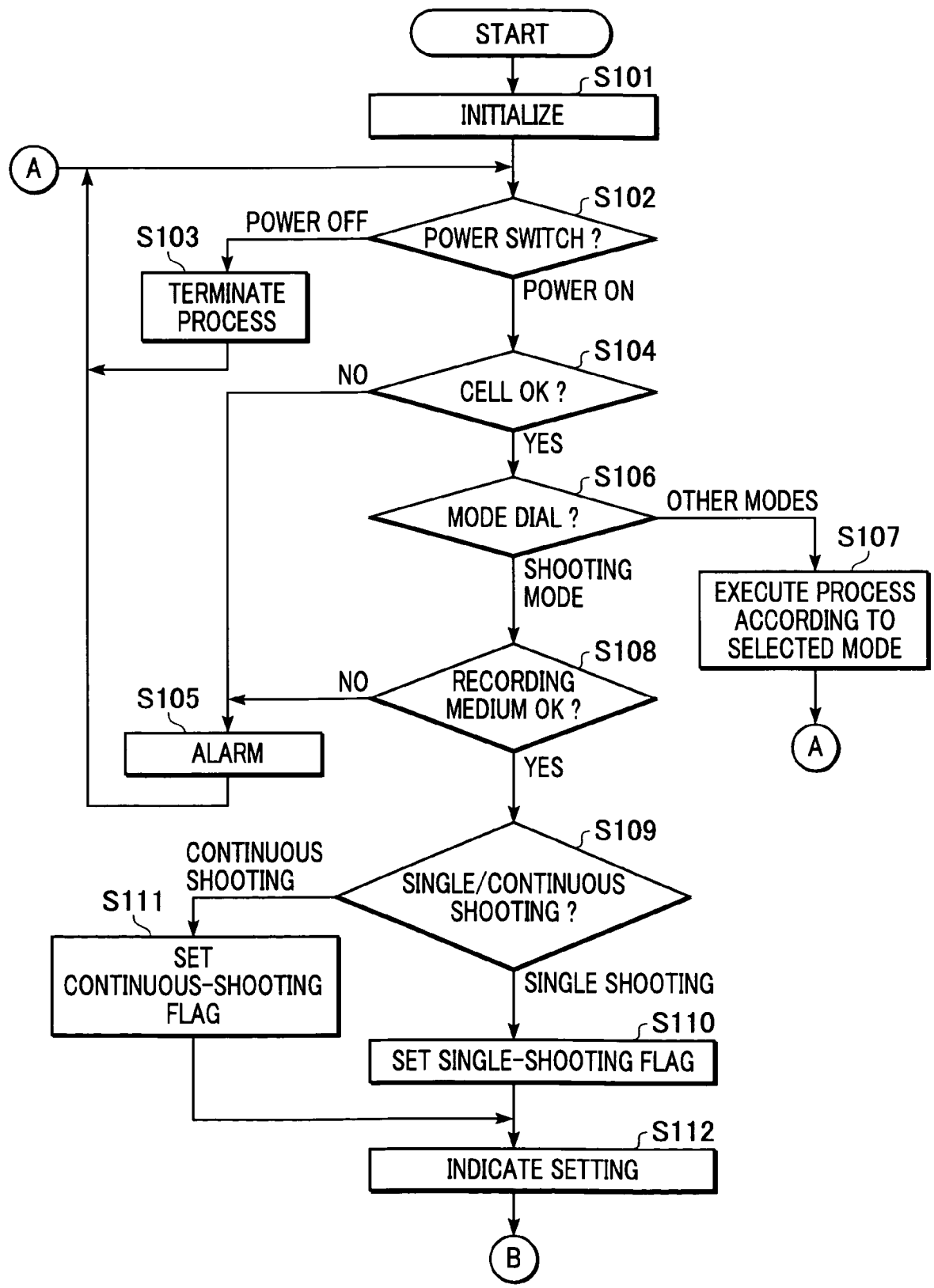
FIG. 2 is part of a flowchart of a main routine of the first and second embodiments.
Figure 3:
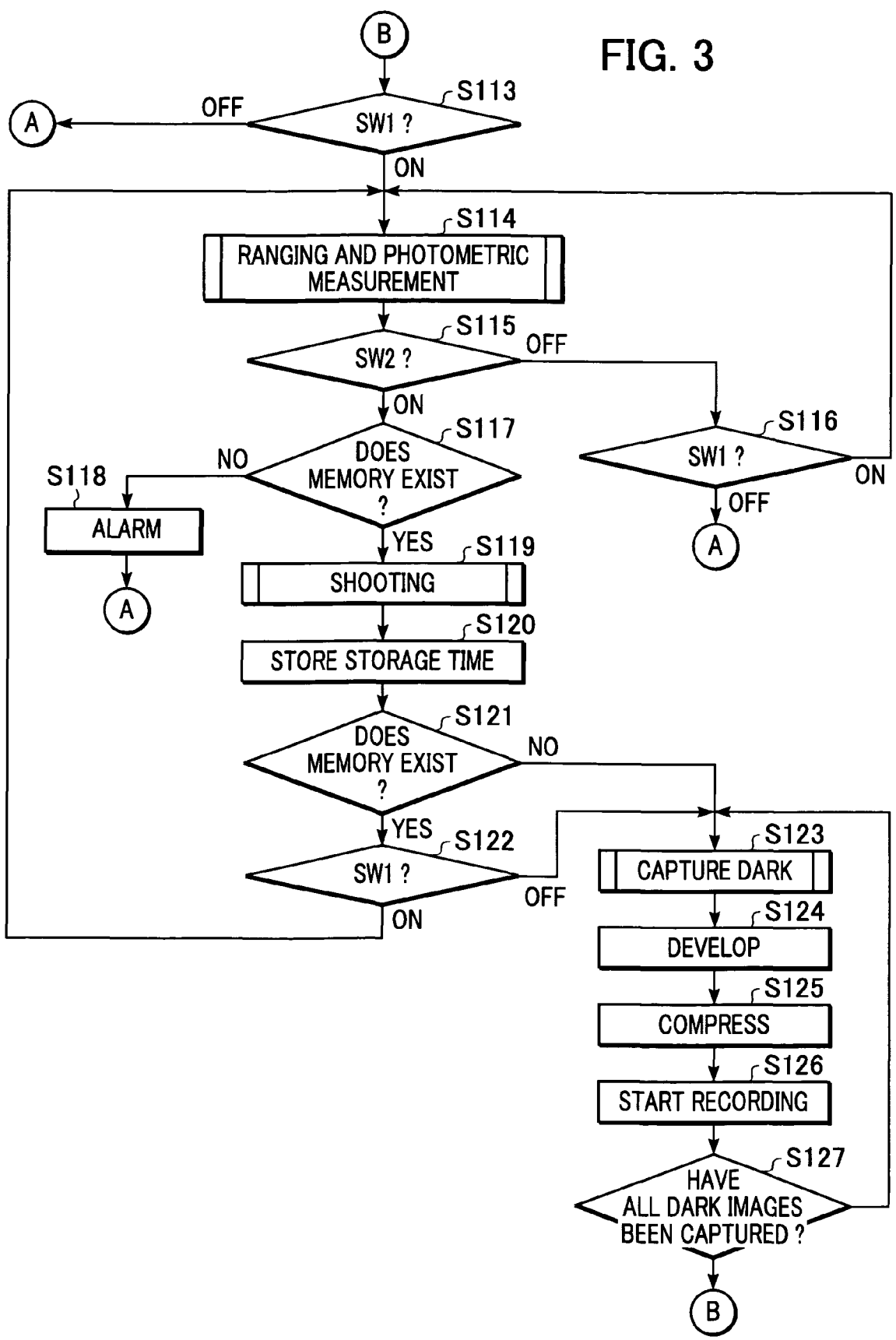
FIG. 3 is part of the flowchart of the main routine of the first and second embodiments.

FIGS. 2 and 3 shows a flowchart of a main routine of the first and second embodiments.

The operation of the imaging device 100 will be described with reference to FIGS. 2 and 3.

Upon power activation by replacing a battery, the system control circuit 50 initializes flags and control variables to perform necessary specified initial settings in the elements of the imaging device 100 (S101).

The system control circuit 50 senses the setting of the power switch 72 wherein when the power switch 72 is set at power-off (S102), it performs predetermined termination operations of changing the indications of the indicators to an end state, recording necessary parameters, set values, set modes including flags and control variables into the nonvolatile memory 56, and shutting off unnecessary power for the elements of the imaging device 100 including the image display section 28 by the power control circuit 80 (S103), and the process returns to S102.

When the power switch 72 is set at power-on (S102), the system control circuit 50 determines whether there is a problem in the remaining capacity and operating condition of a power supply 86, such as a dry cell, for the operation of the imaging device 100, by the power control circuit 80 (S104), wherein when there is a problem, it gives a specified image or voice alarm indication by using the indicator 54 (S105), and the process returns to S102.

When there is no problem in the power supply 86 (S104), the system control circuit 50 senses the setting of the mode dial switch 60, wherein when the mode dial switch 60 is set at a shooting mode (S106), the process proceeds to S108.

When the mode dial switch 60 is set at another mode (S106), the system control circuit 50 executes a process according to the selected mode (S107), and when the process is completed, the process returns to S102.

The system control circuit 50 determines whether the recording medium 200 or 210 is mounted, acquires the administrative information of image data recorded in the recording medium 200 or 210, and determines whether the operating state of the recording medium 200 or 210 has a problem in the operation of the imaging device 100, particularly, in the record playback operation of image data to the recording medium (S108), wherein when there is a problem, it gives a predetermined image or voice alarm indication by the indicator 54 (S105) and the process returns to S102.

As a result of determining whether the recording medium 200 or 210 is mounted, acquiring the administrative information of image data recorded in the recording medium 200 or 210, and determining whether the operating state of the recording medium 200 or 210 has a problem in the operation of the imaging device 100, particularly, in the record playback operation of image data to the recording medium (S108), when there is no problem, the process proceeds to S109.

The system control circuit 50 checks the set state of the single/continuous shooting switch 68 for setting single/continuous shooting (S109), wherein when single shooting has been selected, it sets a single/continuous shooting flag to single shooting (S110), and wherein when continuous shooting has been selected, it sets the single/continuous shooting flag to continuous shooting (S111), wherein when the flag setting has been completed, the process proceeds to S112.

The single/continuous shooting switch 68 allows the setting to be freely switched between a single shooting mode in which one frame is photographed when the shutter switch SW2 is pressed and which moves to a standby mode and a continuous shooting mode in which continuous pictures are taken while the shutter switch SW2 is pressed.

The state of the single/continuous shooting flag is stored in an internal memory in the system control circuit 50 or the memory 52.

The system control circuit 50 provides image or voice indications of various setting states of the imaging device 100 with the indicator 54 (S112). When the image indication of the image display section 28 is at ON, also the image display section 28 is used to provide image or voice indications of various setting states of the imaging device 100.

When the shutter switch SW1 has not been pushed (S113), the process returns to S102.

When the shutter switch SW1 has been pushed (S113), the system control circuit 50 performs ranging measurement to focus the taking lens 310 on an object and performs photometric measurement to determine an f/number and shutter timing (S114) and the process proceeds to S115. During the photometric measurement, flash setting is performed.

The ranging and photometric measurement will be specifically described later with reference to FIG. 4.

When the shutter switch SW2 has not been pushed (S115), the process proceeds to S116, and when also the shutter switch SW1 has not been pushed, the process returns immediately to S102.

When the shutter switch SW2 has been pushed (S115), the system control circuit 50 determines whether an image-storage buffer area capable of storing photographed image data exists in the memory 30 (S117), wherein when no new-image-data storage area exists in the image-storage buffer area of the memory 30, it gives a predetermined image or voice alarm indication with the indicator 54 (S118) and the process returns to S102.

An example of this situation includes a state in which directly after the maximum frames that can be stored in the image-storage buffer area of the memory 30 have been continuously taken, the first image to be read from the memory 30 and to be written to the recording medium 200 or 210 has not yet been recorded to the recording medium 200 or 210 and there is no available storage space in the image-storage buffer area of the memory 30.

When the photographed image data is stored in the image-storage buffer area of the memory 30 after compression, the amount of the compressed image data varies depending on the setting of the compression mode, so that it is determined in S117 whether there is an available storage space on the image-storage buffer area of the memory 30.

When the memory 30 has the image-storage buffer area capable of storing the photographed image data (S117), the system control circuit 50 executes a shooting process to read out an image pickup signal accumulated for a specified time from the image pickup device 14 and write the photographed image data to a specified area of the memory 30 through the A/D converter 16, the image processing circuit 20, and the memory control circuit 22 or, alternatively, directly through the A/D converter 16 and the memory control circuit 22 (S119).

The details of the shooting process S119 will be described later with reference to FIG. 5.

The storage time of the next shooting is stored in the internal memory of the system control circuit 50 or the memory 52.

This is necessary information for a dark capture operation in the next step. It is determined whether the memory 30 has an image-storage buffer area capable of storing the next photographed image data (S121). When the memory 30 has the image-storage buffer area capable of storing the photographed image data, the process moves to a next-frame shooting standby mode and it is determined whether the shutter switch SW1 is at ON (S122). When the shutter switch SW1 is at ON in S122, the process returns to S114. When it is determined to be No in Step 121 or OFF in S122, the process moves to a dark capture operation (S123).

The system control circuit 50 performs a dark capture operation to store a noise component of the image pickup device 14, such as a dark current, for the same time as in main shooting with the shutter 12 closed, and to read out the stored noise image signal (S123) and the process proceeds to S124.

The details of the dark capture operation S123 will be described later with reference to FIG. 6.

The system control circuit 50 reads out part of the image data written to a specified area of the memory 30 through the memory control circuit 22, performs a white-balance (WB) integral operation necessary for developing, and stores the operation result in the internal memory of the system control circuit 50 or the memory 52.

The system control circuit 50 reads out the photographed image data written to the specified area of the memory 30 using the memory control circuit 22 and the image processing circuit 20 as necessary, and performs various developing operations including an auto-white-balancing (AWB) operation, a gamma conversion, and a color conversion using the operation result stored in the internal memory of the system control circuit 50 or the memory 52 (S124).

The system control circuit 50 reads out the image data written to the specified area of the memory 30 and performs image compression depending on the set mode with the compression/expansion circuit 32 (S125), and then writes the processed photographed image data to the available memory space of the image-storage buffer area in the memory 30.

In execution of the series of shooting process, the system control circuit 50 reads out the image data stored in the image-storage buffer area of the memory 30 and starts a recording operation to write it to the recording medium 200 or 210 such as a memory card or a CF (R) card through the interface 90 or 94 or the connector 92 or 96 (S126).

Every time new photographed and processed image data is written to an available memory space of the image-storage buffer area in the memory 30, the image-data recording operation is executed.

In order to show that writing is in operation while image data is written to the recording medium 200 or 210, the indicator 54 gives a recording-medium writing operation indication such as flashing an LED.

The system control circuit 50 determines whether all dark images have been captured by the combination of storage times stored in the internal memory of the system control circuit 50 or the memory 52, wherein when they have been captured, the process moves to S113 to prepare for the next shooting. When not all the dark images have been captured, the process returns to S123, wherein the dark images are captured again.

In this way, a series of shooting processes is completed.

Figure 4:
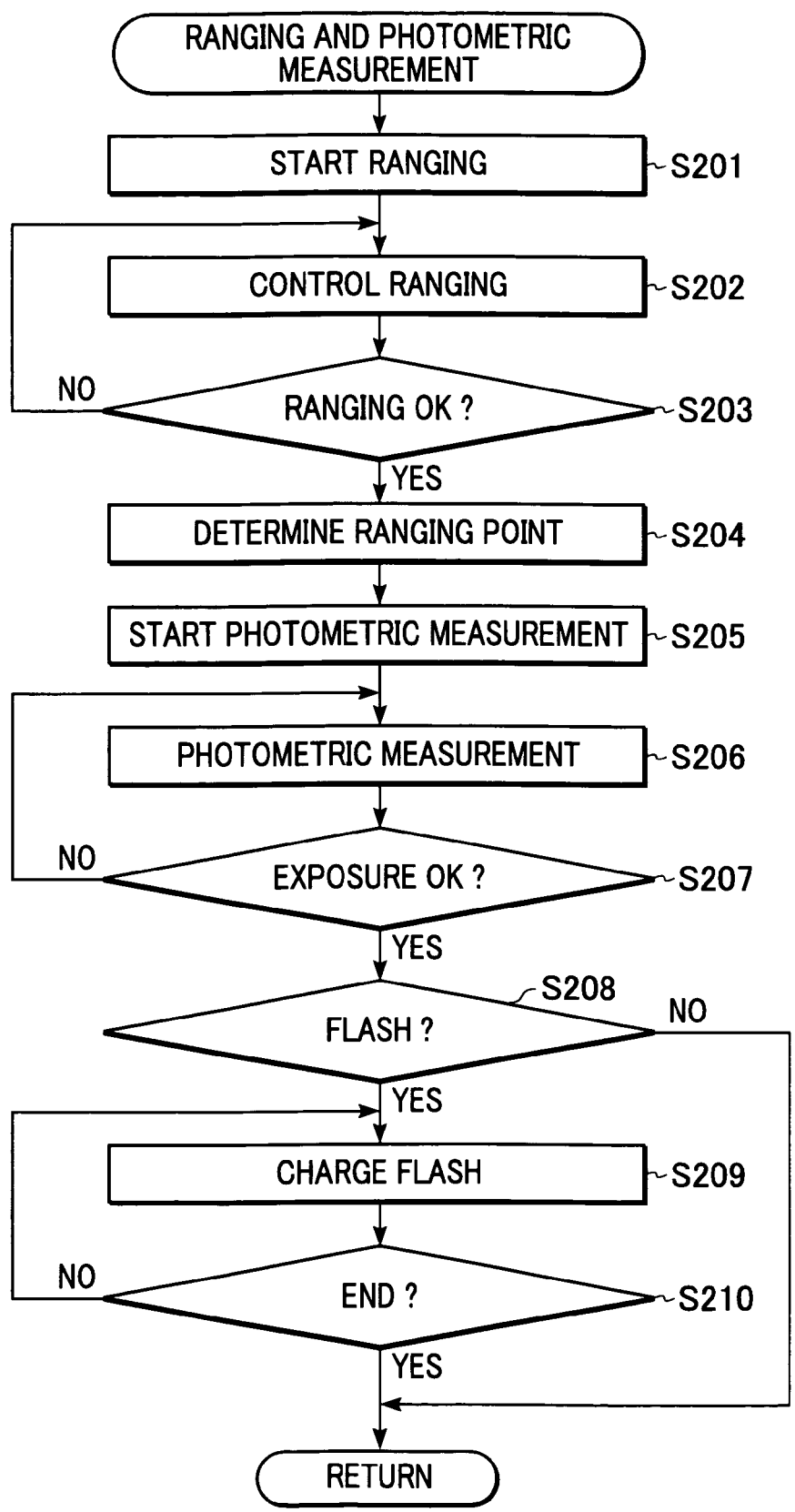
FIG. 4 is a flowchart of a ranging and photometric routine of the first and second embodiments.

FIG. 4 shows a detailed flowchart of ranging and photometric measurements in S114 of FIG. 3.

In the ranging and photometric measurements, various signals between the system control circuit 50 and the aperture control circuit 340 or the ranging control circuit 342 are transmitted through the interface 120, the connectors 122 and 322, the interface 320, and the lens-system control circuit 350.

The system control circuit 50 starts an AF operation through the image pickup device 14, the ranging circuit 42, and the ranging control circuit 342 (S201).

The system control circuit 50 determines the in-focus condition of the image formed as an optical image by letting the light incident on the lens 310 into the ranging circuit 42 through the aperture 312, the lens mounts 306 and 106, the mirror 130, and a ranging submirror (not shown) and performs AF control to detect in-focus condition with the ranging circuit 42 while driving the lens 310 with the ranging control circuit 342 (S202) until it is determined the image is in focus (S203).

When it is determined that the image is in focus (S203), the system control circuit 50 determines an in-focus point among a plurality of ranging points in footage and stores the determined ranging point data, ranging data, and a set parameter in the internal memory of the system control circuit 50 or the memory 52, and the process proceeds to S205.

Subsequently, the system control circuit 50 starts an AE operation with the photometric circuit 46 (S205).

The system control circuit 50 determines the exposure condition of the image formed as an optical image by letting the light incident on the lens 310 into the photometric circuit 46 through the aperture 312, the lens mounts 306 and 106, the mirrors 130 and 132, and a photometric lens (not shown) and performs photometric measurement with the shutter control circuit 40 (S206) until it is determined that exposure is correct (S207).

When it is determined that the exposure is correct (S207), the system control circuit 50 stores the photometric data and the set parameter into the internal memory of the system control circuit 50 or the memory 52, and the process proceeds to S208.

The system control circuit 50 determines an f/number (Av) and a shutter speed (Tv) depending on the exposure determined in the ranging measurement at S206 and the shooting mode set by the mode dial switch 60.

The system control circuit 50 then determines the charge storage time of the image pickup device 14 depending on the determined shutter speed (Tv) and performs a shooting process and a dark capture operation for the charge storage time.

The system control circuit 50 determines whether flash is needed on the basis of the data obtained in the photometric measurement at S206 (S208), wherein when flash is needed, a flash flag is set to charge the flash 48 (S209) until the charge of the flash 48 is completed (S210).

When the charge of the flash 48 has been completed (S210), the ranging and photometric routine S122 is completed.

Figure 5:
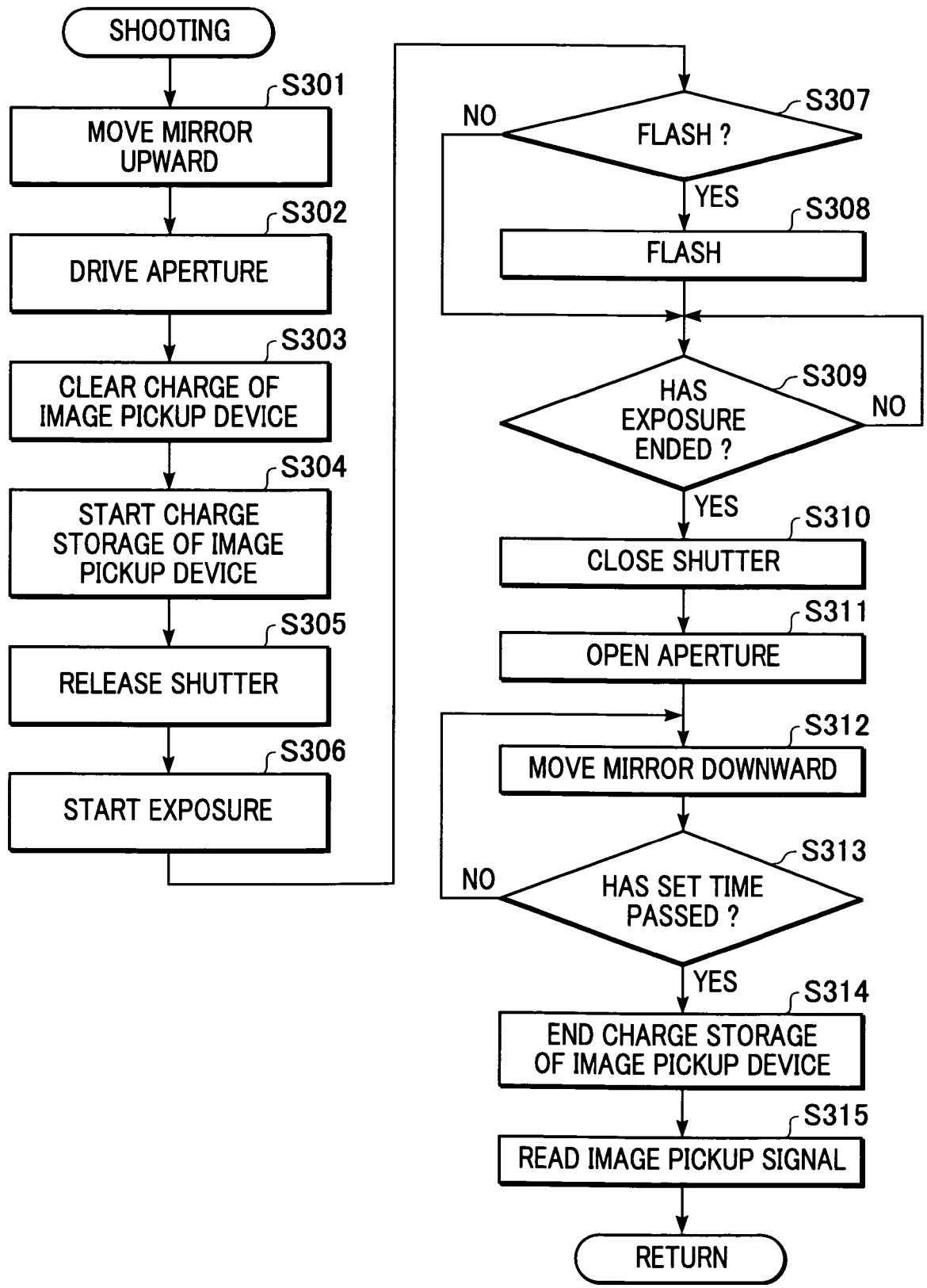
FIG. 5 is a flowchart of a shooting routine of the first and second embodiments.

FIG. 5 is a detailed flowchart of the shooting process of S119 in FIG. 3.

In the shooting process, various signals between the system control circuit 50 and the aperture control circuit 340 or the ranging control circuit 342 are transmitted through the interface 120, the connectors 122 and 322, the interface 320, and the lens-system control circuit 350.

The system control circuit 50 moves the mirror 130 to a mirror-up position by a mirror driving circuit (not shown) (S301) and drives the aperture 312 to a specified f/number with the aperture control circuit 340 on the basis of the photometric data stored in the internal memory of the system control circuit 50 or the memory 52 (S302).

The system control circuit 50 clears the charge of the image pickup device 14 (S303) and then starts the storage of the charge of the image pickup device 14 (S304), and thereafter the shutter control circuit 40 releases the shutter 12 (S305) to start the exposure of the image pickup device 14 (S306).

Here it is determined by the flash flag whether the flash 48 is needed (S307), wherein when it is needed, the flash 48 is fired (S308).

The system control circuit 50 waits for the completion of the exposure of the image pickup device 14 in accordance with the photometric data (S309), and close the shutter 12 with the shutter control circuit 40 (S310) to complete the exposure of the image pickup device 14.

The system control circuit 50 drives the aperture 312 to a release f/number with the aperture control circuit 340 (S311) and moves the mirror 130 to a mirror-down position with a mirror driving circuit (not shown) (S312).

When a set charge storage time has passed (S313), the system control circuit 50 completes the charge storage of the image pickup device 14 (S314) and reads out a charge signal from the image pickup device 14 and writes photographed image data to a specified area in the memory 30 through the A/D converter 16, the image processing circuit 20, and the memory control circuit 22 (S315).

After the series of operations have been completed, the shooting routine S119 is completed.

Figure 9:
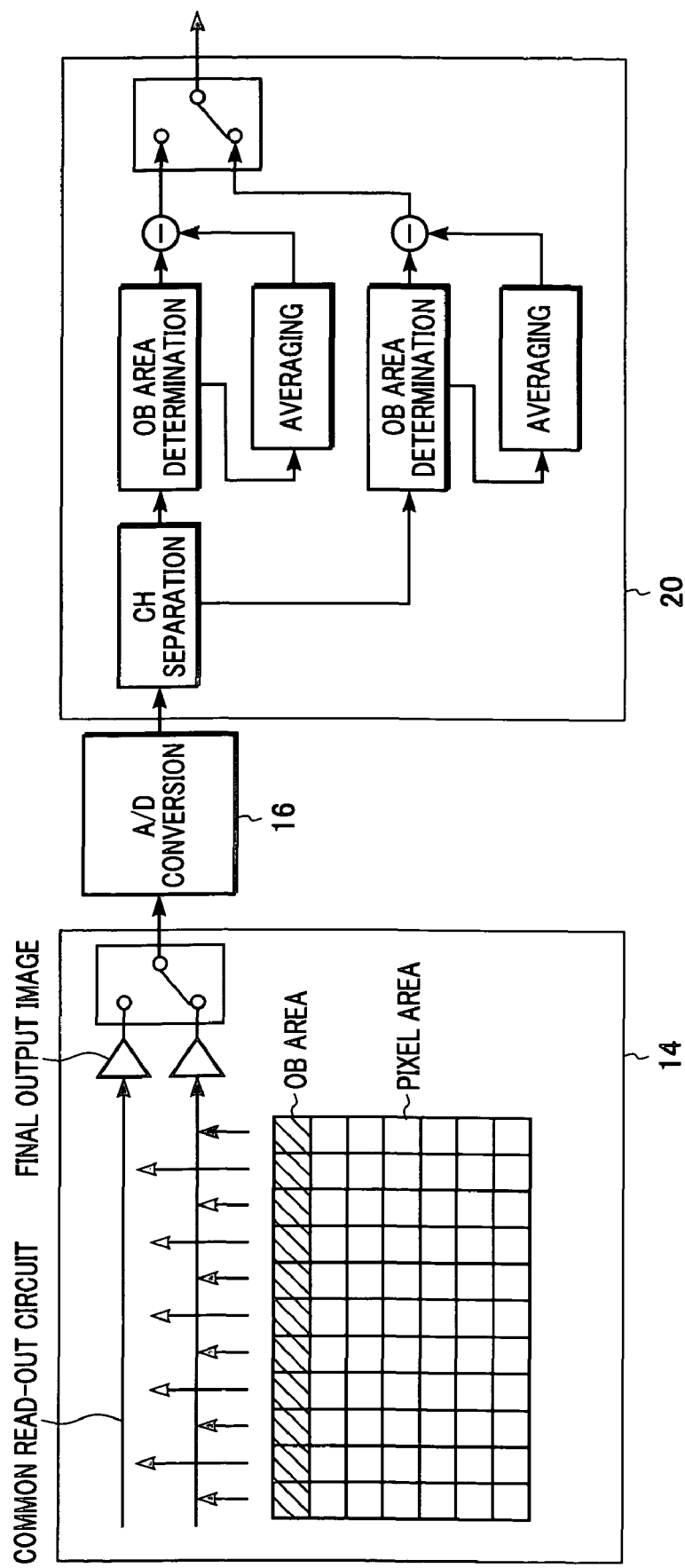
FIG. 9 is a diagram of the flow of data from the image pickup device to an image processing circuit according to the first and second embodiments.

Referring to FIG. 9, the structure of the interior of the image pickup device 14 and the interior of the read-out circuit will be described. The numerals of the components of FIG. 9 correspond to those of FIG. 1. The interior of the image pickup device of the embodiments are operated through two channels. The image pickup device 14 also has a multiplex circuit therein, having one external output line. A photoelectric conversion area having a plurality of photoelectric converters includes an unshielded pixel area and a shielded optical black area (OB area).

The A/D converter 16 converts an output analog signal from the image pickup device 14 to digital data.

The image processing circuit 20 includes a channel dividing section, an OB determination section, an OB averaging section, and a clamp section. The channel dividing section is a circuit for dividing a channel in agreement with the inner channels of the image pickup device 14. Since the image pickup device 14 varies in offset and gain for each channel, it needs to be divided for processing at the beginning. The OB determination section separates the OB area and an effective pixel area of the image pickup device 14 from each other. The output of the OB section is averaged to thereby calculate the dark level of the image pickup device 14 for each channel. The output is clamped by the clamp section and so the offset of the effective pixel is removed. Finally, the divided channels are returned to the initial state and data is transferred to the memory.

As described above, of the image pickup device 14, the OB area first outputs a signal and it is averaged in the image processing circuit 20, so that the photographed image data can be integrated for the OB area without using an image-storage buffer area capable of storing the photographed image data.

Figure 6:
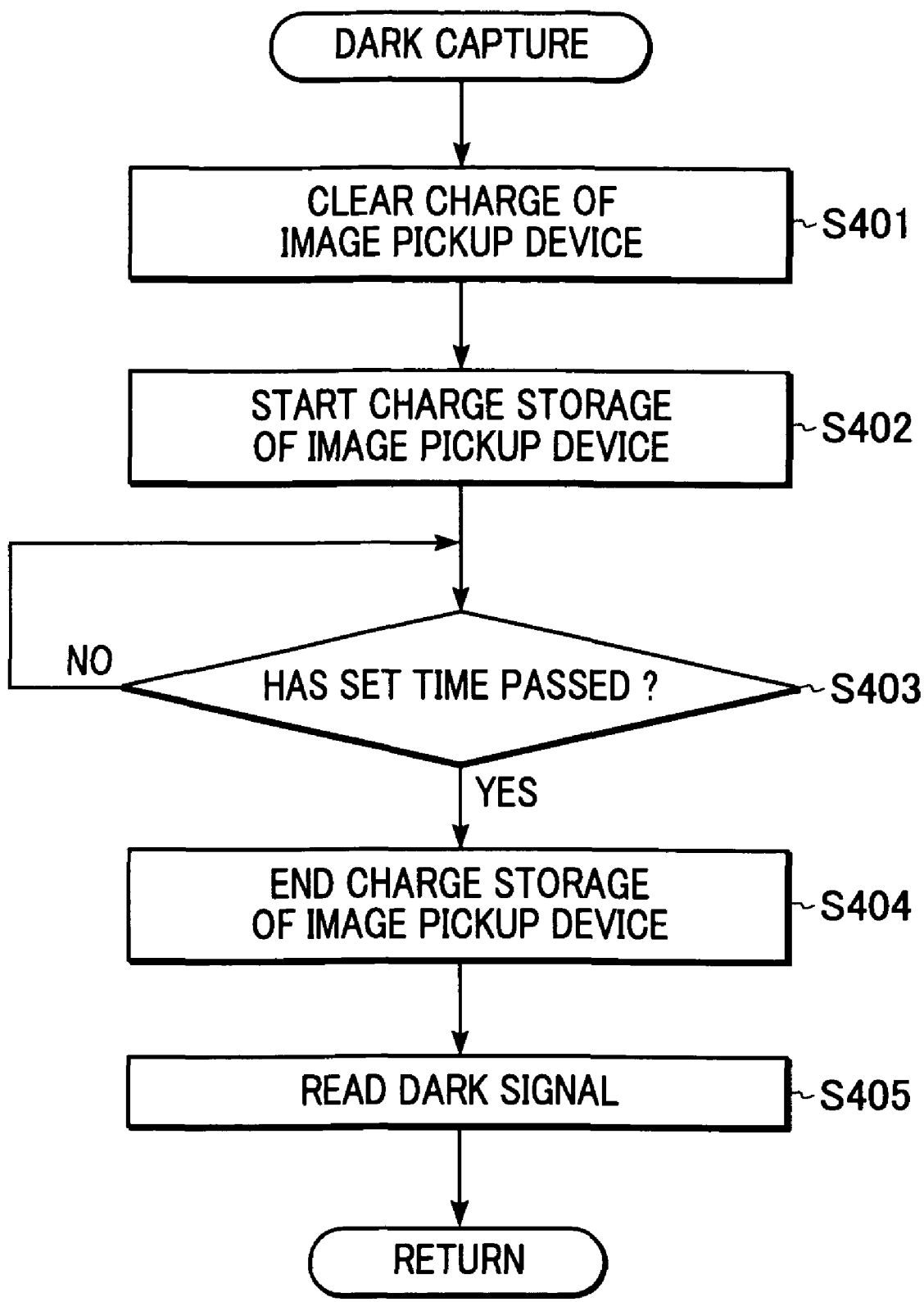
FIG. 6 is a flowchart of a dark capture routine of the first and second embodiments.

FIG. 6 is a detailed flowchart of the dark capture operation in S123 of FIG. 3.

After the charge of the image pickup device 14 has been cleared (S401), the storage of the charge of the image pickup device 14 is started with the shutter 12 closed (S402). The order of the dark capture operation when multiple frames are photographed is in the order of shooting.

After a set charge storage time has passed (S403), the system control circuit 50 completes the charge storage of the image pickup device 14 (S404), reads out a charge signal from the image pickup device 14, and writes image data (dark image data) into a specified area of the memory 30 through the A/D converter 16, the image processing circuit 20, and the memory control circuit 22 (S405).

The dark image data is used in development in a state in which a shooting process is previously executed and photographed image data is read out from the image pickup device 14 and written in the memory 30.

The development is performed using the dark image data, so that the photographed image data can be corrected for picture degradation including a pixel defect due to a dark current noise generated by the image pickup device 14 and a minute defect inherent to the image pickup device 14.

After the series of processes have been completed, the dark capture routine S123 is completed.

Figure 7:
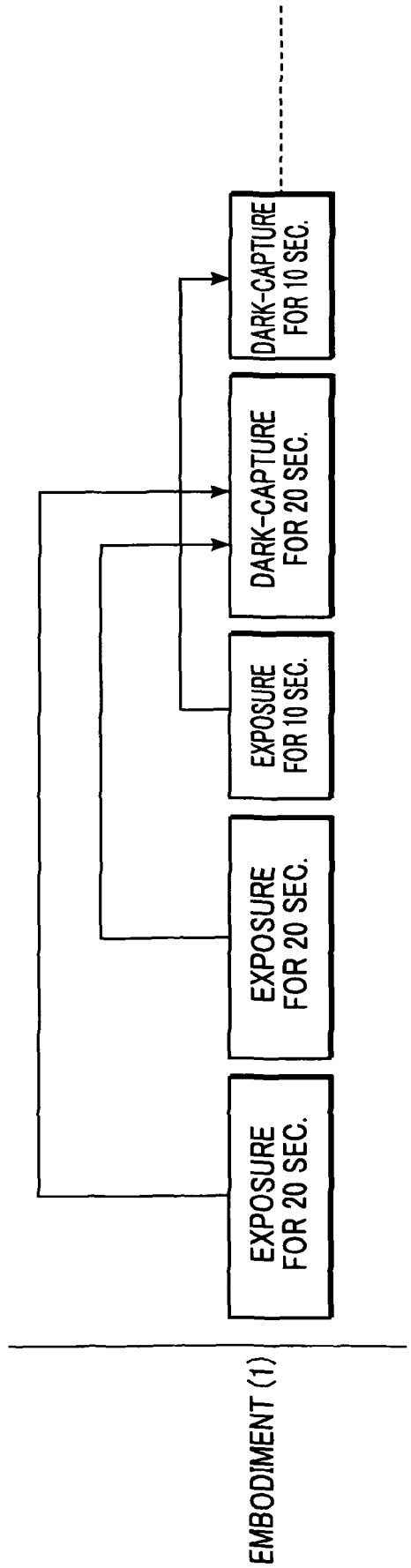
FIG. 7 is an explanatory diagram of the flow of the shooting operation of the first embodiment.
Figure 8:
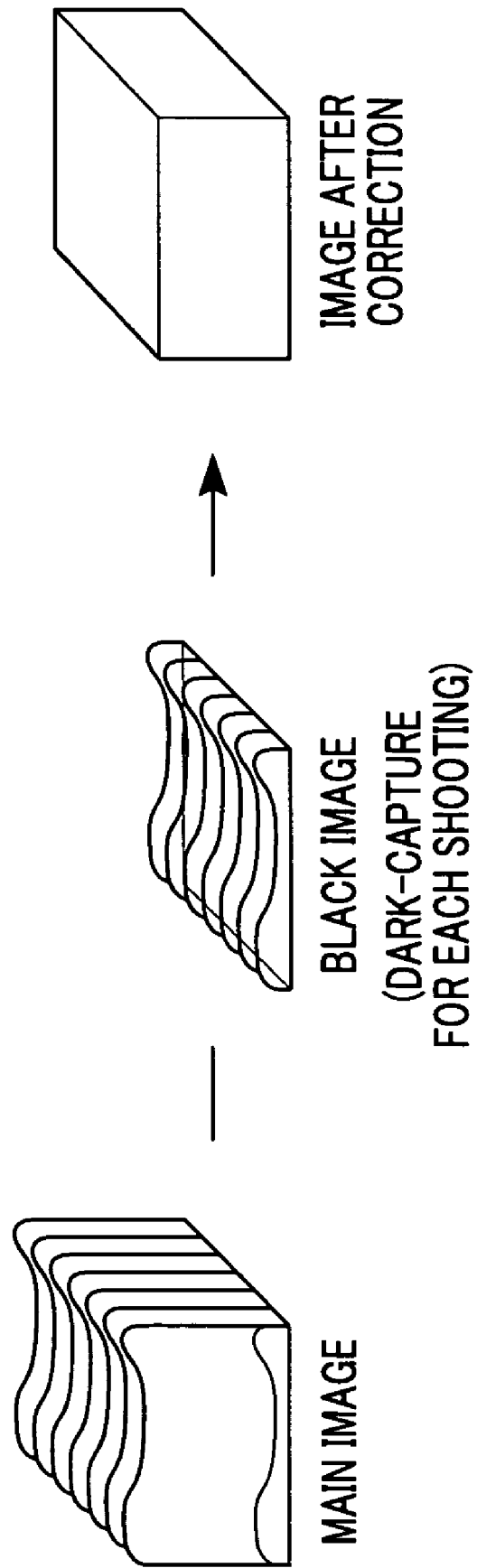
FIG. 8 is a schematic diagram of the correction of a main image based on two dimensional dark-shading correction data or horizontal-dark-shading correction data of the first and second embodiments.

FIG. 7 is an explanatory diagram of the flow of the shooting operation according to the first embodiment of the invention. FIG. 8 is a schematic diagram of the correction of a main image based on two dimensional dark-shading correction data or horizontal-dark-shading correction data.

Figure 12:
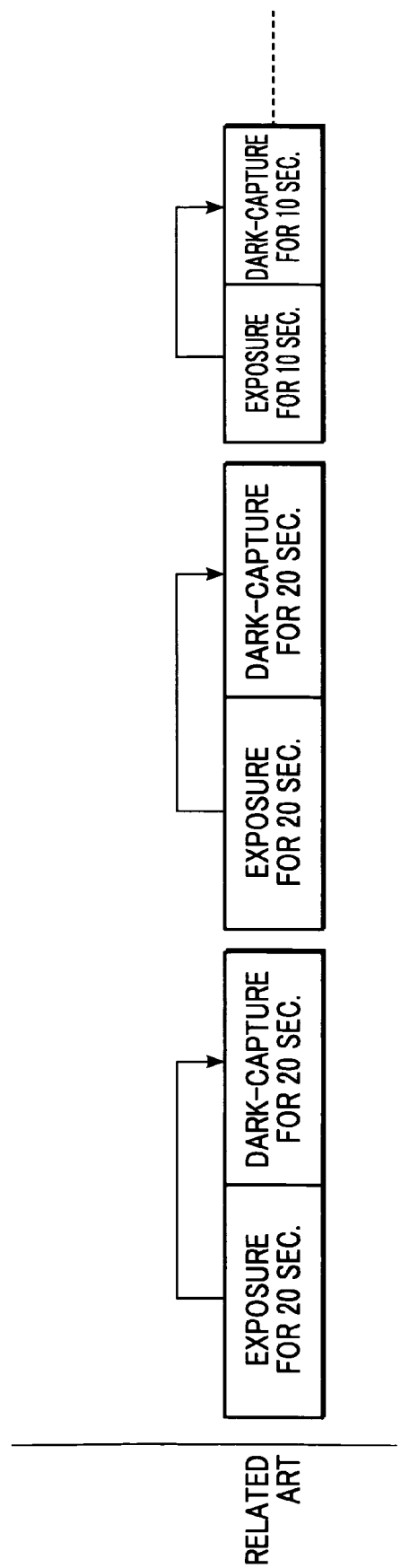
FIG. 12 is a diagram of the flow of the operation of the related art.

As FIG. 12 shows, conventionally, when exposure time (second) has changed, dark capture comes immediately after shooting, thus causing the problem of variations of a release time lag; a shutter cannot be released for 20 seconds after 20-second exposure.

According to this embodiment, when the respective storage times of shooting have been stored and the shooting has been completed, dark capture is performed, so that a release time lag does not vary until the memory is filled with image data. In FIG. 7, two frames are taken with 20-second exposure and one frame is taken with 10-second exposure, while for dark capture one 20-second exposure and one 10-second exposure are performed after the shooting.

In the image processing circuit 20, the 20-second exposed data is corrected with 20-second-exposed dark data and the 10-second exposed data is corrected with 10-second-exposed dark data. When a shooting operation is started during the dark capture operation, the shooting operation is continued, so that a release time lag does not vary.

When the whole continuous shooting is performed with the same storage time, one frame of dark data is captured with the same storage time after the completion of the continuous shooting and multiple frames of image data acquired by continuous shooting are corrected with the dark data.

Since the description of FIG. 8 is the same as those of FIG. 2, FIG. 6, and FIG. 3, it is omitted.

In this embodiment, as described in FIG. 9, since correction is performed for each imaging operation on the basis of the signal from the OB area, even if there is an interval between the image data and the dark data, accurate correction is allowed.

It is also possible to construct not to make a correction based on the signal from the OB area for each imaging although the accuracy of correction is reduced.

Figure 10:
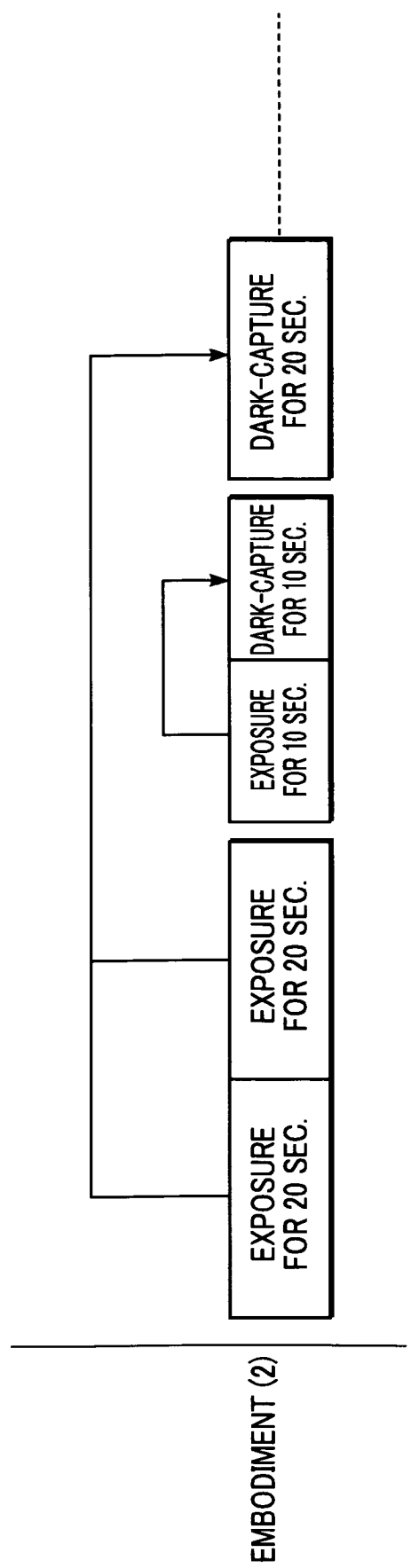
FIG. 10 is an explanatory diagram of the flow of an imaging operation of the second embodiment.
Figure 11:
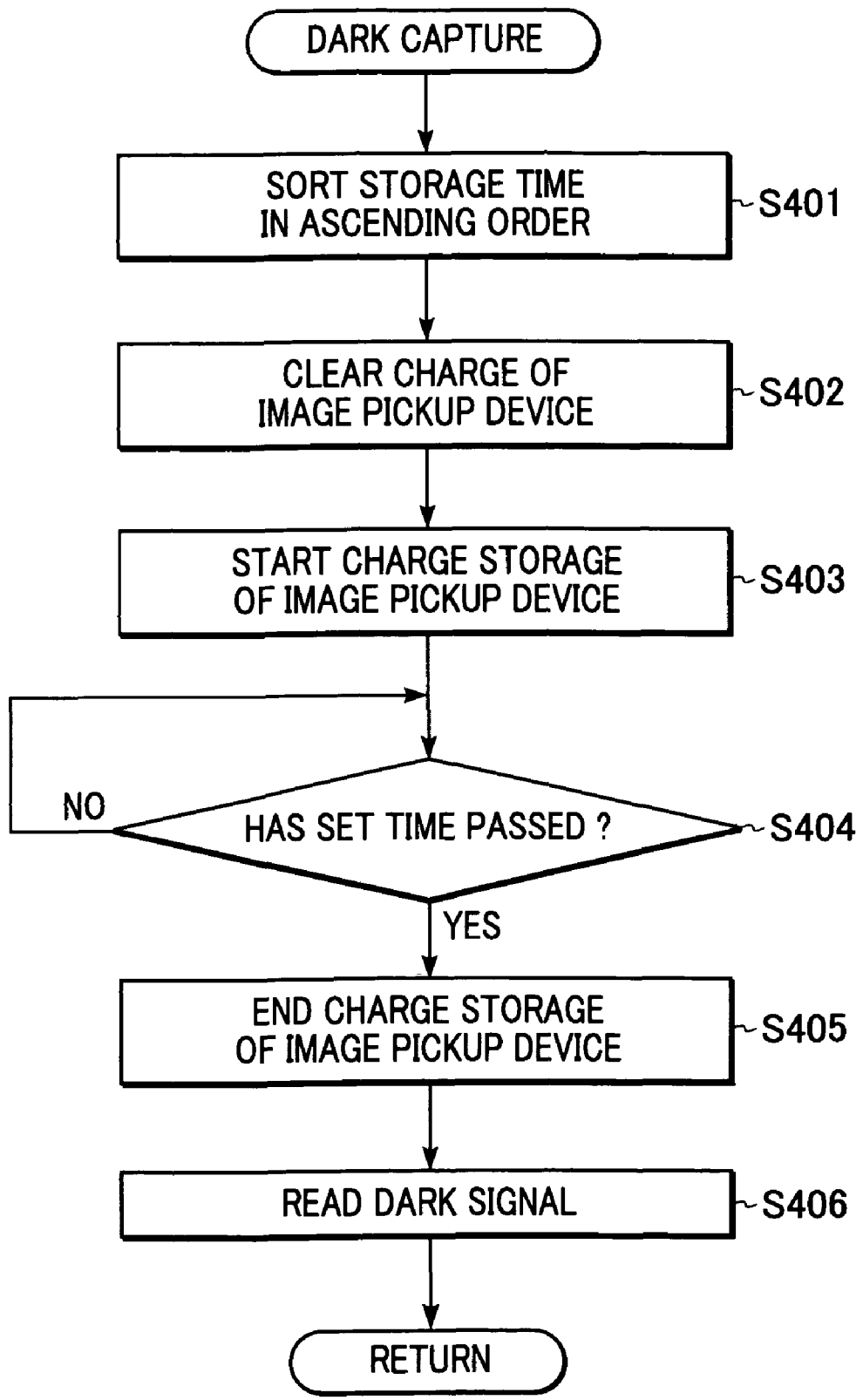
FIG. 11 is a flowchart of a dark capture routine of the second embodiment.

Referring to FIGS. 10 and 11, the second embodiment of the invention will be described.

The second embodiment is different from the first embodiment in that the order of dark capture operation is changed and the same in the other parts. Therefore, only the difference will be described.

FIG. 10 shows the flow of a shooting process according to the second embodiment.

In the first embodiment, the dark capture operation is made in the same order as that of shooting, while in this embodiment, the capture storage time is sorted by the system control circuit 50 in ascending order and a dark image is captured in ascending order of the storage time.

With the related-art structure in FIG. 12, the dark capture operation is made for each frame of shooting, while in this embodiment, the dark capture operation is made after the shooting operation has been completed; after a 10-second dark image with a short storage time has first been captured, a 20-second dark image is captured.

It is for the purpose of decreasing an unphotographable time as much as possible when there is no available memory space in the buffer storage area that the dark image with a short storage time is first captured. Although this embodiment has two 20-second exposure frames, the dark capture is made for one frame, thereby achieving high-speed processing.

In the image processing circuit 20, the 20-second exposed data is corrected with 20-second-exposed dark data and the 10-second exposed data is corrected with 10-second-exposed dark data.

The flow of the dark capture operation will be described with reference to FIG. 11.

The system control circuit 50 sorts the storage time stored in the first shooting in ascending order (S401). After the charge of the image pickup device 14 has been cleared (S402), the charge storage of the image pickup device 14 is started with the shutter 12 closed (S403).

After a specified set charge storage time has passed (S404), the system control circuit 50 completes the charge storage of the image pickup device 14 (S405), reads out a charge signal from the image pickup device 14 and writes image data (dark image data) into a specified area of the memory 30 through the A/D converter 16, the image processing circuit 20, and the memory control circuit 22 (S406).

The dark image data is used in development in a state in which the shooting process is previously executed and the photographed image data is read out from the image pickup device 14 and written in the memory 30.

The development is made using the dark image data, so that the photographed image data can be corrected for picture degradation including a pixel defect due to a dark current noise generated by the image pickup device 14 and a minute defect inherent to the image pickup device 14.

After the series of processes have been completed, the dark capture routine S123 is completed. In the first and second embodiments, the single/continuous shooting is switched by using the single/continuous shooting switch 68; however, it is also possible to construct to switch the single/continuous shooting by selecting the operation mode with the mode dial switch 60.

While the embodiments are described as the charge storage time of the main shooting process and that of the dark capture operation being equal to each other, there is no problem even if they are different from each other only within the range in which sufficient data can be obtained to correct the dark current noise and so on.

Since the shooting operation cannot be performed during the dark capture operation in S123, image or voice indication indicating that the imaging device 100 is in busy state may be given by the indicator 54 or the image display section 28.

While the embodiments have been described as shooting while moving the mirror 130 to a mirror-up position or a mirror-down position, the mirror 130 may be a half mirror and may not be moved for shooting.

The recording media 200 and 210 may not necessarily be memory cards such as a PCMCIA card and a Compact Flash (R) card and a hard disk but may be optical disks such as a micro DAT, an magneto-optical disk, CD-R, and CD-WR or a phase change optical disk such as a DVD.

The recording media 200 and 210 may be composite media of a memory card and a hard disk. Part of the composite media may be detachable.

In the embodiments, the recording media 200 and 210 are described as being separated from the imaging device 100 and capable of being freely connected thereto. However, either or all of the recording media may be fixed to the imaging device 100.

A single or plurality of the recording medium 200 or 210 may be connected to the imaging device 100.

While the recording media 200 and 210 are described as being mounted to the imaging device 100, the recording medium may be either singular or plural.

As described above, the imaging devices according to the first and second embodiments include a photoelectric conversion area having a plurality of photoelectric converters formed of a pixel area and an OB area; the system control circuit 50 for controlling a first mode for continuously acquiring image data by multiple object-imaging operations including an imaging operation with multiple different storage times and a second mode for sequentially acquiring correction data acquired in the multiple different storage times with the photoelectric conversion area shielded, after the first mode; and the image processing circuit 20 for correcting the image data by using the correction data. Consequently, the time lag during the continuous shooting can be eliminated.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus comprising:

a photoelectric conversion area including a plurality of photoelectric converters;

a controller configured to continuously perform a plurality of image-taking operations at a plurality of different charge accumulation times, respectively, in a state where the photoelectric conversion area is not shielded by a shutter, and continuously perform a plurality of dark capture operations at the plurality of different charge accumulation times, respectively, in a state where the photoelectric conversion area is shielded by the shutter after completion of continuous performing the plurality of image-taking operations, wherein the controller does not perform any of the plurality of dark capture operations between one image-taking operation and the following image-taking operation in the plurality of image-taking operations; and an image processor configured to correct image data which is acquired in the plurality of image-taking operations with correction data which is acquired in the plurality of dark capture operations, wherein the plurality of different charge accumulation times of the dark capture operations are equal to that of the image-taking operations.

2. The imaging apparatus according to claim 1, wherein the accumulation times for generating the correction data in the dark capture operations are different, and the dark capture operations are performed in the same order as the image taking operations.

3. The imaging apparatus according to claim 1, wherein the accumulation times for generating the correction data in the dark capture operations are different, and the dark capture operations are performed in ascending order of the image taking operations.

* * * * *